US011696083B2

(12) United States Patent
Elko et al.

(10) Patent No.: US 11,696,083 B2
(45) Date of Patent: Jul. 4, 2023

(54) IN-SITU CALIBRATION OF MICROPHONE ARRAYS (71) Applicant: MH Acoustics, LLC, Summit, NJ (US)

(72) Inventors: Gary W. Elko, Summit, NJ (US); Jens M. Meyer, Fairfax, VT (US)

(73) Assignee: MH Acoustics, LLC, Summit, NJ (US)

( * ) Notice: Subject to any disclaimer, the term of this patent is extended or adjusted under 35 U.S.C. 154(b) by 0 days.

(21) Appl. No.: 17/500,057

(22) Filed: Oct. 13, 2021

(65) Prior Publication Data
US 2022/0124446 A1 Apr. 21, 2022

Related U.S. Application Data (60) Provisional application No. 63/094,372, filed on Oct. 21, 2020.

(51) Int. Cl.
H04S 7/00 (2006.01)
H04R 3/00 (2006.01)
(Continued)

(52) U.S. Cl.
CPC ............ *H04S 7/301* (2013.01); *G10K 15/12* (2013.01); *H04R 1/222* (2013.01); *H04R 3/005* (2013.01); *H04R 3/04* (2013.01); *H04R 29/006* (2013.01)

(58) Field of Classification Search
CPC ...... H04R 1/326; H04R 1/406; H04R 29/005; H04R 2430/25; H04R 2201/401; H04R 2201/403; H04R 2201/405; G10K 11/34
(Continued)

(56) References Cited

U.S. PATENT DOCUMENTS 3,626,365 A 12/1971 Press et al.
4,042,779 A 8/1977 Craven et al.
(Continued)

FOREIGN PATENT DOCUMENTS

EP 0381498 A2 8/1990
EP 0869697 A2 10/1998
(Continued)

OTHER PUBLICATIONS

Non-Final Office Action; dated Feb. 8, 2007 for U.S. Appl. No. 10/500,938, filed Jul. 8, 2004.
(Continued)

*Primary Examiner* — William A Jerez Lora
(74) *Attorney, Agent, or Firm* — Mendelsohn Dunleavy, P.C.; Steve Mendelsohn (57) ABSTRACT

According to certain embodiments, a microphone array having a plurality of microphone elements is calibrated by ensonifying the microphone array at a first direction relative to the microphone array with a first acoustic signal to concurrently generate a first set of audio signals from two or more of the microphone elements and processing the first set of audio signals to calibrate the two or more microphone elements. One or more other sets of audio signals can be generated by ensonifying the microphone array with one or more other acoustic signals at one or more other directions relative to the microphone array, where the two or more microphone elements are calibrated using the first set and the one or more other sets of audio signals. The calibration process can be performed outside of an anechoic chamber using one or more acoustic sources located outside or inside the microphone array.

19 Claims, 4 Drawing Sheets (51) Int. Cl.
- *G10K 15/12* (2006.01)
- *H04R 3/04* (2006.01)
- *H04R 1/22* (2006.01)
- *H04R 29/00* (2006.01)

(58) Field of Classification Search
USPC .............................. 381/56, 58, 91, 92, 122
See application file for complete search history.

(56) References Cited

U.S. PATENT DOCUMENTS

| | | | |
|---|---|---|---|
| 4,741,038 A | 4/1988 | Elko et al. | |
| 5,288,955 A | 2/1994 | Staple et al. | |
| 5,325,872 A | 7/1994 | Westermann | |
| 5,515,445 A | 5/1996 | Baumhauer, Jr. et al. | |
| 5,524,056 A | 6/1996 | Killion et al. | |
| 5,602,962 A | 2/1997 | Kellermann | |
| 5,610,991 A | 3/1997 | Janse | |
| 5,687,241 A | 11/1997 | Ludvigsen | |
| 5,878,146 A | 3/1999 | Andersen | |
| 6,041,127 A | 3/2000 | Elko | |
| 6,072,878 A | 6/2000 | Moorer | |
| 6,239,348 B1 | 5/2001 | Metcalf | |
| 6,272,229 B1 | 8/2001 | Baekgaard | |
| 6,292,571 B1 | 9/2001 | Sjursen | |
| 6,317,501 B1 | 11/2001 | Matsuo | |
| 6,339,647 B1 | 1/2002 | Andersen et al. | |
| 6,526,147 B1 | 2/2003 | Rung | |
| 6,845,163 B1 | 1/2005 | Johnston et al. | |
| 6,904,152 B1 | 6/2005 | Moorer | |
| 7,171,008 B2 | 1/2007 | Elko | |
| 7,587,054 B2 | 9/2009 | Elko et al. | |
| 7,599,248 B2 | 10/2009 | Williams | |
| 8,433,075 B2 | 4/2013 | Elko et al. | |
| 9,197,962 B2 | 11/2015 | Elko et al. | |
| 9,445,198 B2 | 9/2016 | Elko et al. | |
| 9,628,905 B2 | 4/2017 | Elko et al. | |
| 10,659,873 B2 | 5/2020 | Elko et al. | |
| 2002/0054634 A1 | 5/2002 | Martin et al. | |
| 2003/0147539 A1 | 8/2003 | Elko et al. | |
| 2005/0123149 A1 | 6/2005 | Elko et al. | |
| 2005/0195988 A1 | 9/2005 | Tashev et al. | |
| 2005/0276423 A1 | 12/2005 | Aubauer et al. | |
| 2006/0147054 A1* | 7/2006 | Buck ...................... | H04R 3/005 381/91 |
| 2009/0296946 A1* | 12/2009 | Zhang ................... | H04R 29/005 381/58 |
| 2010/0202628 A1 | 8/2010 | Meyer et al. | |
| 2011/0051953 A1* | 3/2011 | Makinen ................ | H04R 3/005 381/92 |
| 2012/0093344 A1 | 4/2012 | Sun et al. | |
| 2012/0288114 A1 | 11/2012 | Duraiswami et al. | |
| 2015/0110310 A1* | 4/2015 | Minnaar ................ | H04R 25/30 381/307 |
| 2019/0373390 A1* | 12/2019 | Horbach .............. | H04R 29/005 |
| 2022/0053281 A1* | 2/2022 | Sheaffer ............... | H04R 29/005 |

FOREIGN PATENT DOCUMENTS

| | | | |
|---|---|---|---|
| EP | 1571875 A2 | 9/2005 | |
| JP | H06-303689 A | 10/1994 | |
| JP | 11168792 A | 6/1999 | |
| JP | 2001-124621 A | 5/2001 | |
| WO | WO9516259 A1 | 6/1995 | |
| WO | WO9529479 A1 | 11/1995 | |
| WO | WO0158209 A1 | 8/2001 | |
| WO | WO03061336 A1 | 7/2003 | |
| WO | WO2015013058 A1 | 1/2015 | |

OTHER PUBLICATIONS

Final Office Acton; dated Jul. 17, 2007 for U.S. Appl. No. 10/500,938, filed Jul. 8, 2004; 11.
Non-Final Office Action; dated Feb. 7, 2008 for U.S. Appl. No. 10/500,938, filed Jul. 8, 2004.
Non-Final Office Action; dated Oct. 3, 2008 for U.S. Appl. No. 10/500,938, filed Jul. 8, 2004.
Final Office Action; dated Apr. 14, 2009 for U.S. Appl. No. 10/500,938, filed Jul. 8, 2004.
Notice of Allowance and Fees Due; dated Jun. 8, 2009 for U.S. Appl. No. 10/500,938, filed Jul. 8, 2004.
Non-Final Office Action; dated Apr. 26, 2012 for U.S. Appl. No. 12/501,741, filed Jul. 19, 2009.
Communication Pursuant to Article 94(3); dated Dec. 17, 2008 for EP Application No. 03702059.1.
Communication Pursuant to Article 94(3); dated Sep. 25, 2009 for EP Application No. 03702059.1.
Communication Pursuant to Article 94(3); dated Dec. 8, 2009 for EP Application No. 03702059.1.
International Search Report and Written Opinion; dated Aug. 16, 2006 for PCT Application No. PCT/US2006/007800.
Notice of Allowance and Fees Due; dated Mar. 4, 2013 for U.S. Appl. No. 12/501,741, filed Jul. 13, 2009.
Nelson, P. A. et al., "Spherical Harmonics, Singular-Value Decomposition and the Head-Related Transfer Function", Journal of Sound and Vibration (2001) 239(4), p. 607-637.
P. M. Morse, K. U. Ingard: "Theoretical Acoustics" 1986, Princeton University Press, Princeton (New Jersey), ISBN: 0-691-02401-4, pp. 333-356, XP007906606.
Meyer Jens: "Beamforming for a Circular Microphone Array Mounted on Spherically Shaped Objects" Journal of the Acoustical Society of America, AIP/Acoustical Society of America, Melville, NY, US, Bd. 109, Nr. 1, Jan. 1, 2001 (Jan. 1, 2001), pp. 185-193, XP012002081, ISSN: 0001-4966.
Jérome Daniel, "Représentation de champs acoustiques, application à la transmission et à la reproduction des scènes sonores complexes dans un contexte multimédia," Ph.D. Thesis (2000), pp. 149-204, XP007909831.
Exparte Quayle Action; mailed Mar. 15, 2013 for U.S. Appl. No. 13/834,221, filed Mar. 15, 2013.
Notice of Allowance; dated Feb. 2, 2015 for U.S. Appl. No. 13/834,221, filed Mar. 15, 2013.
International Search Report and Written Opinion; dated Oct. 13, 2014 for the PCT Application No. PCT/US2014/046607.
Frost, O., "An Algorithm for Linearly Constrained Adaptive Array Processing," Proceedings of the IEEE, vol. 60, No. 8, Aug. 1972, pp. 926-935.
Sondhi, M. M., et al., "Adaptive Optimization of Microphone Arrays Under A Nonlinear Constraint," ICASSP 86, Tokyo, pp. 981-984.
Meyer, J., et al., "A Highly Scalable Spherical Microphone Array Based on an Orthonormal Decomposition of the Soundfield," 2002 IEEE, pp. II-1781 to II-1784.
"Audio Signal Processing for Telecollaboration in the Next-Generation Multimedia Communication," Edited by Huang, et al., Bell Laboratories, Lucent Technologies, pp. Title-29.
Kogon, S. M., "Eigenvectors, Diagonal Loading and White Noise Gain Constraints for Robust Adaptive Beamforming," Conference Record of the 37th Asilomar Conference on Signals, Systems, & Computers, Pacific Groove, CA, Nov. 9-12, 2003, New York, NY, IEEE, US, vol. 2, pp. 1853-1857.
Rafaely, B., "Spherical Microphone Array with Multiple Nulls for Analysis of Directional Room Impulse Responses," IEEE 2008, pp. 281-284.
Van Trees, H., "Optimum Array Processing: Chapter 7-Adaptive Beamformers" Part IV of Detection, Estimation, and Modulation Theory, Apr. 4, 2002, 6 pages.
Chin, T. Y., et al., "A 25-GHz Compact Low-Power Phased-Array Receiver with Continuous Beam Steering in CMOS Technology," IEEE Journal of Solid-State Circuits, IEEE Service Center, Piscataway, NJ, USA, vol. 45, No. 11, Nov. 1, 2010, pp. 2273-2282.
Elko, G. W., et al., "Adaptive Beamformer for Spherical Eignbeamforming Microphone Arrays," 2014 4th Joint Workshop on Hands-Free Speech Communication and Microphone Arrays, IEEE, May 12, 2014, pp. 52-56.

(56) References Cited

OTHER PUBLICATIONS

Meyer, J., et al., "Spherical Microphone Array for Spatial Sound Recording," Audio Engineering Society convention Paper, New York, NY, US, Oct. 10, 2003, pp. 1-9.
Benesty, Jacob, et al. "Chapter 4: Sparse Adaptive Filters." Acoustic MIMO Signal Processing. Signals and Communication Technology. Springer, Berlin, Heidelberg. (2006): 59-84.
Kivinen, Jyrki, et al. "Exponentiated Gradient Versus Gradient Descent for Linear Predictors." University of California, Santa Cruz. (1994): 11-13.

* cited by examiner

IN-SITU CALIBRATION OF MICROPHONE ARRAYS

CROSS-REFERENCE TO RELATED APPLICATIONS

This application claims the benefit of the filing date of U.S. provisional application No. 63/094,372, the teachings of which are incorporated herein by reference in their entirety.

BACKGROUND

Field of the Disclosure

The present disclosure relates to audio equipment and, more specifically but not exclusively, to techniques for calibrating microphone arrays.

Description of the Related Art

This section introduces aspects that may help facilitate a better understanding of the disclosure. Accordingly, the statements of this section are to be read in this light and are not to be understood as admissions about what is prior art or what is not prior art.

Microphone array beamformer processing is almost always based on a linear combination of the audio signals generated by the multiple microphones in the array, which is tuned to the particular application and/or to physical constraints based on the specific size and geometry of the array. The linear combination is typically designed by computing general filters applied to each microphone so that, when the combined audio signals attain a desired spatial response or responses that meet specific design constraints. One underlying implementation issue with microphone array beamforming relates to the calibration requirements for the beamformer. Another issue is how to test and verify the proper calibration of the microphones in a simple way when the array is deployed in the field.

A relatively new approach to beamforming uses a method where the array geometry matches one of the thirteen separable coordinate systems for the solution to the acoustic wave equation. Having this unique underlying geometry allows for a beamformer processing architecture that relatively easily extracts the underlying sound-field spatial modes (sometimes referred to as Eigenbeams). In general, Eigenbeam decomposition of the sound field is not limited to just separable coordinate systems, but using coordinate systems that are separable enables an elegant mathematical framework for the Eigenbeam decomposition of the sound field. The "Eigenbeamforming" approach is attractive due to the inherent spatial symmetry and results in a beamformer with angle-invariant spatial decomposition that is highly desirable in beamformer design. Eigenbeamforming utilizing the orthonormal decomposition of the sound and general beamformers can then be realized by appropriately linearly combining the derived spatial harmonic signals to obtain a beampattern with desired properties.

One particularly appealing microphone array geometry uses the spherical coordinate system and is generally referred to as spherical microphone array processing. Spherical microphone array processing is based on the spherical harmonic decomposition (spherical Eigenbeams) of the sound field. Spherical harmonic beamforming is therefore a two-step process. In modal Eigenbeamforming, the first step is a decomposition stage, and the second step is a modal combination beamformer stage. Typically, the spherical array operates as a super-directive beamformer (a beamformer that has a much higher directivity than the classic delay-sum beamformer and operates in a range where the size of the sphere is less than the acoustic wavelength) over a wide frequency range.

It is well known that super-directive beamformers are susceptible to inter-sensor mismatch in the microphone responses. For that reason, the microphone capsules that form the spherical array need to be well matched in amplitude and phase. Microphone matching can be done by either pre-selecting the capsules or by applying a calibration weight or filter for each microphone. Although it is advantageous to have closely matched capsules (for instance, similarity in microphone self-noise), the added flexibility that comes from a calibration weight or filter is desirable. A calibration weight or filter that is implemented in software can be updated when new calibration data is available and thereby allowing one to maintain calibration over time.

The frequency response of microphone capsules is typically measured to obtain the calibration data. Two fundamental approaches can be distinguished to perform this measurement: (i) "capsule only" where frequency response of the "raw" microphone capsule is measured before being mounted in the array and (ii) "in situ" where the frequency response of the microphone capsule is measured after already being mounted in the array.

Capsule-only calibration has the advantage of being performed as a free-field measurement in a controlled environment (e.g., a Bruel & Kjaer Anechoic Test Box) or with other specialized acoustic pressure vessel calibration hardware. However, after the array is assembled, this capsule-only approach is no longer practical.

An in-situ calibration technique that maintains the advantages of the "capsule only" approach is described in U.S. Pat. No. 7,587,054, the teachings of which are incorporated herein by reference in their entirety. A calibrator device (essentially a small pressure chamber with a speaker and a reference microphone) is placed over the mounted microphone capsule to measure its response. This approach becomes cumbersome for large arrays with many microphone capsules, such as the mh acoustics em64™ Eigenmike® array, which has 64 capsules. Also, this technique is prone to errors due to potential leaks when the calibrator device is not properly sealed to the microphone under test.

SUMMARY

Problems in the prior art are addressed in accordance with the principles of the present disclosure by a new in-situ calibration technique that allows a microphone array to be calibrated in the acoustic field using a discrete set of acoustic measurement responses to acoustic signals from a known acoustic source at a known source position relative to the device that the microphone array is mounted on or in. As used herein, the term "acoustic signals" refers to the sounds generated by acoustic sources, while the term "audio signals" refers to the electrical signals generated by microphones in response to receiving acoustic signals.

In certain embodiments of the disclosure, a small wideband loudspeaker is used to play a broadband signal that ensonifies, at the same time, all microphone capsules mounted in or on a device. This approach is not uncommon for "open arrays" where the acoustically soft array and a speaker are placed in an anechoic environment and a far-field measurement is made of the microphone responses. However, for an acoustically rigid body having an array of microphones mounted in a spheroidal (e.g., spherical) baffle, this approach is complicated by the following factors:

- The microphone capsules are embedded in a baffle or other structure that causes scattering and diffraction which changes the microphone responses;
- A practical approach should be able to be performed in a standard room environment (not just in an anechoic chamber), but this will add additional room reflections to the measurement signal;
- Each capsule can have a different orientation relative to the sound source, which will play a role at higher frequencies at which the capsule size is on the order of or larger than the acoustic wavelength;
- The acoustic source (e.g., a loudspeaker) can be placed relatively close to the array to overcome room reflections and enable good signal-to-noise ratio (SNR), but such relatively close loudspeaker positions would result in acoustic near-field effects that would need to be accounted for by the calibration algorithm; and
- The physical dimensions of the acoustic source may impact the measured responses.

As used herein, the term "acoustically rigid" means that an object's specific acoustic boundary impedance is significantly higher (e.g., more than 100 times greater) than that of the characteristic impedance of the medium through which sound arrives at the object (in this case, air) as opposed to "acoustically soft" where the object's specific acoustic boundary impedance is not higher than the medium's acoustic impedance.

In one embodiment, the present disclosure is a method for calibrating a microphone array having a plurality of microphone elements. The method comprises (i) ensonifying the microphone array at a first direction relative to the microphone array with a first acoustic signal to concurrently generate a first set of audio signals from two or more of the microphone elements; and (ii) processing the first set of audio signals to calibrate the two or more microphone elements.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
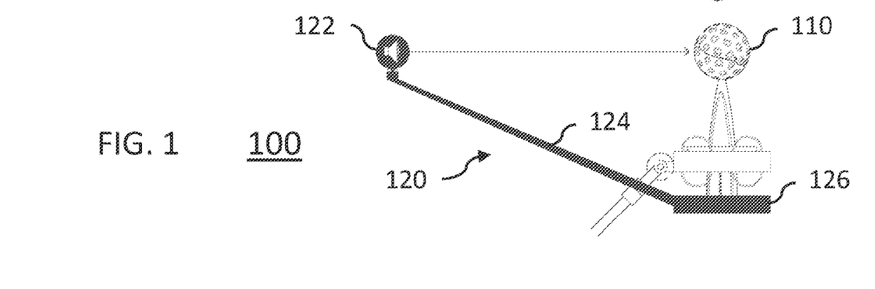
FIG. 1 is a side view of a testing configuration for performing in-situ calibration of a spherical microphone array according to certain embodiments of the present disclosure.

FIG. 1 is a side view of a testing configuration 100 for performing in-situ calibration of a spherical microphone array 110 according to certain embodiments of the present disclosure. As shown in FIG. 1, an assembly of calibration equipment 120 includes an acoustic source 122 (e.g., a suitable loudspeaker) supported by a support arm 124 that is connected to a rotatable base 126, where the elevation of the acoustic source 122 coincides approximately with the center of the spherical array 110 and the acoustic source 122 is oriented such as acoustic signals generated by the acoustic source 122 are directly towards the spherical array 110. Not shown in FIG. 1 is a controller for the calibration assembly that generates control signals (i.e., excitation signals) for controlling the acoustic signals generated by the acoustic source 122 and processes the audio signals generated by the multiple microphone elements of the array 110 in response to those acoustic signals, to generate calibration data for the array 110.

Figure 2:
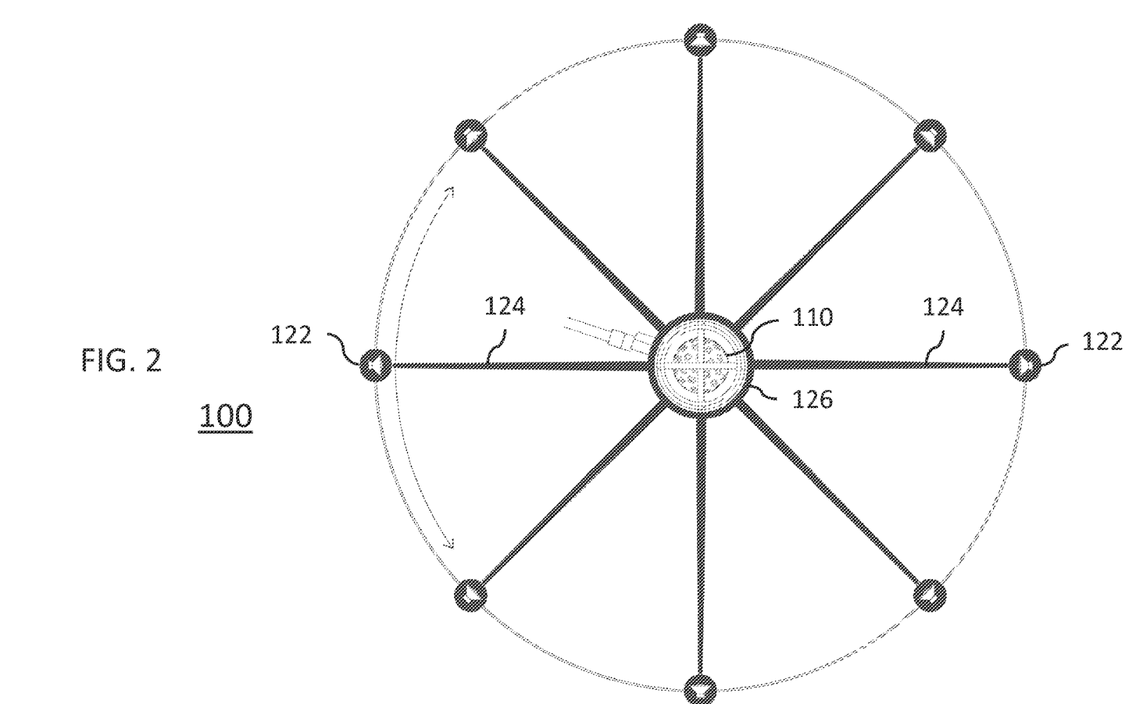
FIG. 2 is a composite plan view of the testing configuration of FIG. 1 showing the acoustic source positioned at eight different angles relative to the spherical array.

FIG. 2 is a composite plan view of the testing configuration 100 of FIG. 1 showing the acoustic source 122 positioned at eight different angles relative to the spherical array 100, which different orientations are enabled by the rotatable base 126. Note that the spherical array 100 does not rotate with the rotatable base 126 such that the eight different positions shown in FIG. 2 correspond to the spherical array 100 being ensonified by the acoustic source 122 from eight different angles. In some implementations, the rotatable base 126 can be rotated at any angle from 0 degrees to 360 degrees. In other implementations, the rotatable base 126 can be rotated at any of a fixed number of angles (e.g., every 15 degrees from 0 degrees to 360 degrees). In some implementations, the rotatable base 126 is rotated manually. In other implementations, the rotatable base 126 has a controllable stepper motor that enables the rotation of the rotatable base 126 to be autonomously controlled by a suitable controller. Note that, in general, it does not matter whether the microphone array rotates and the acoustic source is fixed or vice versa, because it is the relative orientation between the two that matters.

Although the embodiment shown in FIGS. 1 and 2 maintains the acoustic source 122 at an elevation corresponding to the center of the microphone array 110, in other embodiments, the calibration equipment 120 is further able to position the acoustic source 122 at other elevations above and/or below the center of the microphone array 110 and/or at other distances from the microphone array 110. These other elevations and/or other distances can be achieved using a telescoping support arm 124 and/or an adjustable angle between the support arm 124 and the base 126.

Furthermore, instead of having a single, movable acoustic source as in FIGS. 1 and 2, in other implementations, the calibration equipment could have multiple, stationary or movable, acoustic sources at different locations relative to the microphone array.

Figure 3:
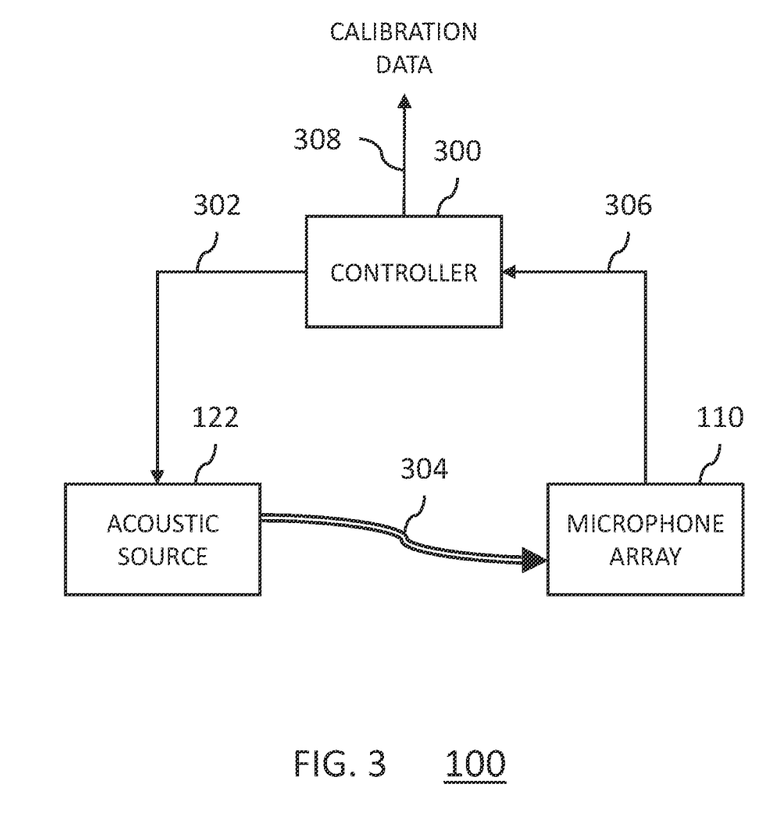
FIG. 3 is a block diagram of the in-situ calibration testing configuration of FIG. 1.

FIG. 3 is a block diagram of the in-situ calibration testing configuration 100 of FIG. 1. As shown in FIG. 3, a controller 300 generates control signals 302 that control the acoustic signals 304 generated by the acoustic source 122. The microphone array 110, being ensonified by those acoustic signals, generates audio signals 306 (one for each microphone element in the array 110) that are processed by the controller 300 to generate calibration data 308 for the array 110 for use in filtering the audio signals generated by microphone elements of the array 110 during on-line operations such as those described in U.S. Pat. Nos. 7,587,054; 8,433,075; 9,197,962; 9,445,198; and 9,628,905, the teachings of all of which are incorporated herein by reference in their entirety.

Measurement of Microphone Transfer Functions

In order to estimate the desired calibration filters, a transfer function from an acoustic source (e.g., a loudspeaker) to each of the microphones in the array is first measured. One can also measure a relative response from a single (reference) microphone to each of the other microphones as part of the measurement dataset which would then match all other microphones to the reference microphone. Alternatively, a reference response could be generated by selectively averaging all or some of the individual microphone responses. The relative responses can be derived from the set of measurements of the loudspeaker to all microphones by normalizing each set of measurements relative to a particular single-microphone response or some combination of measured microphone responses in the array. In both measurement cases, the location of the loudspeaker source and the orientation of the array relative to the source are required for the calibration procedure.

In mathematical terms, the measured output signal $Y_m(\omega)$ of the m-th microphone based on the input excitation signal $X(\omega)$ can be expressed in the angular frequency ($\omega$) domain according to Equation (1) as follows:

$$Y_m(\omega) = X(\omega) T_m(\omega) \quad (1)$$

where the filter $T_m(\omega)$ represents the entire transfer function from the electrical signal $X(\omega)$ applied to the loudspeaker to the audio signal $Y_m(\omega)$ generated by the m-th microphone. In addition to the frequency response of the m-th microphone, the transfer function $T_m(\omega)$ includes the excitation loudspeaker, acoustic wave propagation, microphone array scattering and diffraction as well as microphone directional properties and microphone and associated electronics mismatch due to manufacturing variations. In equation form, $T_m(\omega)$ can be written as the product of all these different components according to Equation (2) as follows:

$$T_m(\omega) = L(\omega) G_m(\omega) S_m(\omega) D_m(\omega) H_m(\omega) \quad (2)$$

where the filter $L(\omega)$ represents the loudspeaker response, the filter $G_m(\omega)$ represents the acoustic wave propagation from the loudspeaker to the m-th microphone, the filter $S_m(\omega)$ represents the acoustic scattering and diffraction due to the microphone array physical structure, the filter $D_m(\omega)$ represents the effects of microphone directivity and electronics mismatch, and the filter $H_m(\omega)$ represents the frequency response of the m-th microphone.

The transfer function $T_m(\omega)$ includes terms that are due to a combination of the loudspeaker and acoustic propagation effects including scattering, diffraction, and microphone-element directivity as well as the actual response of the microphone element itself. If a standard measurement setup can be achieved that fixes the loudspeaker position relative to the microphone array, then the loudspeaker response and all acoustic propagation effects to each microphone will also be fixed. With all these terms fixed, the only remaining variation in the response between similar microphone arrays will be due to the variation in the microphone channel responses. It is precisely this variation that is to be computed so that a calibration filter $C_m(\omega)$ can be formulated to remove this undesired variation that could be detrimental to any on-line signal processing that is done with the microphone signals.

The above calibration procedure could also be used to include the diffraction and scattering of an external physical device and its impact on the spatial response of the microphone array to near-field or far-field acoustic signals. As an example, the microphone array could be mounted on a set of eyeglasses or other head-mounted device. The presence of the user's head can significantly modify the spatial responses of the microphones from external acoustic sources. By making multiple spatial measurements at different angles all around the array, one can use the measured results to include the impact of a device or object that is near the array itself. It is also possible that, at lower frequencies, that numerical models of the nearby object could also be included to further augment the acoustic measurements.

In some embodiments, in-situ calibration measures a "Golden" reference version that has microphones where the responses have been accurately measured so they can be equalized to substantially remove any mismatch variation. The "Golden" reference may also include the diffraction and scattering of nearby objects such as a head-mounted microphone array. Having the measurements from a known calibrated microphone array allows one to use those measurements as a reference for any other microphone array that has the same geometry and physical setup and using the same loudspeaker (or removing the loudspeaker response by equalizing the loudspeaker so its response is removed from the measurement). The M calibration filters $C_m(\omega)$ can then be computed by using the "Golden" reference measurement $T_{Gm}(\omega)$ according to Equation (3) as follows:

$$C_m(\omega) = \frac{T_{Gm}(\omega)}{T_m(\omega)} \quad (3)$$

where $T_m(\omega)$ is the measured transfer function of Equations (1) and (2).

The filter $C_m(\omega)$ shown in Equation (3) represents the calibration frequency response for the m-th microphone. Multiplying the right side of Equation (1) by the computed calibration filter $C_m(\omega)$ will result in the output $Y_m(\omega)$ of any unknown similar microphone array system that is set up in the same manner as the Golden Reference system as being the same as the output $Y_{Gm}(\omega)$ of the Golden Reference system.

Calibration Based on a Known Repeatable Measurement Setup

The idea presented above is to identify the calibration filters $C_m(\omega)$ of all M microphones that remove (ideally) all microphone and electronic mismatch effects using a reference measurement for comparison. For this approach to work, the measurement setup should be fixed and repeatable. Also, the calibration filters $C_m(\omega)$ should be independent of the room characteristics so the calibration measurement can be performed in any typical acoustic environment. With these two conditions, it can be assumed that (i) the calibration filters are linear and time-invariant for all calibration measurements and (ii) all deviations can be attributed to the variations in the responses of the microphones and associated electronics responses.

Based on the above discussion, a measurement setup should be repeatable and independent of the acoustic environment. For practical purposes, the measurement should also be easy to set up.

For in-situ measurements using the testing configuration 100 of FIG. 1, the calibration assembly 120 configured with the microphone array 110 should be placed near the center of a room (i.e., as far away from the room boundaries as practical) to allow the impulse response from the direct incident wave to be free of any significant room reflections (the purpose of which is discussed later). The acoustic source (i.e., loudspeaker) 122 should be placed relatively close to the array 110 but preferably a few array diameters away from the baffle sphere (e.g., 0.4 meter for an 8-cm spherical microphone array which is 5 times the 8-cm diameter).

Placing the loudspeaker 122 closer to the microphone array 110 allows one to achieve a desired signal level at all of the microphones while simultaneously moving the early reflections and reverberation from the room further away from the direct path impulse responses. The loudspeaker 122 should not be too close in order to avoid excessive near-field effects, i.e., large level differences between (i) the microphones facing the loudspeaker 122 and (ii) the microphones being further away and partly shaded by the baffle. Also, at close distances, reflections back and forth to and from the loudspeaker 122 may cause undesired measurement issues.

The combination of array 110 and loudspeaker 122 should be placed in the center of the acoustic environment with maximal distances to all other reflecting surfaces and objects. One caveat here though is that some microphone arrays are designed to operate with a nearby scatterer such as a person wearing the microphone array on their head. In this case, design measurements should include these acoustic diffraction and scattering effects in the design of the calibration filters.

FIG. 1 shows a simplified diagram of how the calibration would be accomplished using a mechanical jig to place the loudspeaker 122 at specific angles around the microphone array 110. A computer software application generates a signal used to estimate all the desired transfer functions (e.g., impulse responses) between the loudspeaker and all the microphones in the microphone array.

Although FIG. 2 shows the loudspeaker positioned at fixed specific angles in the azimuthal plane (every 45 degrees), the jig (i.e., rotatable base 126 and support arm 124) could be designed to allow continuous positioning in both azimuthal and elevation angles as well as different radii (where the loudspeaker could be moved along the radial support arm 124 towards the microphone array). It would also be possible to have the calibration algorithms run from software running inside the microphone or from hardware and software inside the loudspeaker where each device would be connected and possibly powered via a wired or wireless digital interface allowing for both devices to synchronize their sample rate clocks. The user may input some geometry information but it may be possible for the locations to be determined from acoustic information without user input.

The relative arrangement between the array and the loudspeaker (distance and orientation) should be repeatable from one measurement setup to the next. This is achieved with the help of the support arm 124 which has a positive locator on the array as well as on the measurement loudspeaker. In the extreme, the rod could be attached to the microphone array on the one end and the loudspeaker can be attached to the rod on the other end. This would guarantee a repeatable physical setup.

Calibration Based on Simulated Responses

Instead of basing the calibration on a comparison to a reference measurement as described above, some array geometries allow the use of a mathematical model that takes in account all the acoustic propagation effects around the baffle in which the microphones in the array are mounted. Using a mathematical model allows for more flexibility in the calibration measurement since the model can be adapted to varying situations, e.g., loudspeaker distance, loudspeaker size, spherical baffle diameter, and deviations in the calibration due to the non-flat amplitude and non-linear phase in the reference microphone or the loudspeaker system. A mathematical model can also be developed to include nearby objects on which the microphone array is mounted that are themselves amenable to mathematical or numerical modeling.

For an acoustically rigid spherical baffle, one could use the well-known solution to the acoustic wave equation using the separable spherical coordinate system. For a unit-amplitude acoustic plane-wave impinging on the sphere from spherical polar angle $\vartheta$, the acoustic pressure G at any point $[r_s, \vartheta]$ outside the sphere of radius $r_a$ can be written according to Equation (4) as follows:

$$G(\vartheta, k, r_s, r_a) = \sum_{n=0}^{\infty} (2n+1) i^n \left( j_n(kr_s) - \frac{j'_n(kr_a)}{h_n^{(2)\prime}(kr_a)} h_n^{(2)}(kr_s) \right) P_n(\cos\vartheta), \quad (4)$$

where:
  k is the acoustic wavenumber which is $2\pi/\lambda$, where $\lambda$ is the acoustic wavelength;
  $r_s$ is measurement position radius from the coordinate system origin, which is at the center of the sphere;
  $r_a$ is the radius of the sphere;
  prime (') denotes the derivative with respect to the argument;
  $j_n$ is the spherical Bessel function of order n;
  $h_n^{(2)}$ represents the spherical Hankel function of the second kind of order n; and
  $P_n$ represents Legendre functions of degree n.

The acoustic sound pressure at a point on the surface of the sphere $[r_a, \vartheta_s, \varphi_s]$ for an impinging sound wave from direction $[\vartheta, \varphi]$, can be also rewritten using the addition theorem given by Equation (5) as follows:

$$P_n(\cos\theta) = \sum_{m=-n}^{n} \frac{(n-m)!}{(n+m)!} P_n^m(\cos\vartheta) P_n^m(\cos\vartheta_s) e^{im(\varphi-\varphi)} \quad (5)$$

where θ is the angle between the impinging sound wave and the radius vector of the observation point [$r_a$, $\vartheta_s$, $\varphi_s$] on the surface of the sphere. Substituting Equation (5) into Equation (4) yields the normalized sound pressure G on the spherical scatterer according to Equation (6) as follows:

$$G(\vartheta_s, \varphi_s, kr_s, kr_a, \vartheta, \varphi) = \qquad (6)$$

$$\sum_{n=0}^{\infty} b_n(kr_a, kr_s)(2n+1)i^n \sum_{m=-n}^{n} n\frac{(n-m)!}{(n+m)!} P_n^m(\cos\vartheta)P_n^m(\cos\vartheta_s)e^{im(\varphi-\varphi_s)}$$

where $P_n^m$ are the associated Legendre functions of order m and degree n, and the coefficients $b_n$ are the radial-dependent terms given by Equation (7) as follows:

$$b_n(kr_a, kr_s) = \left(j_n(kr_s) - \frac{j'_n(kr_a)}{h_n^{(2)'}(kr_a)}h_n^{(2)}(kr_s)\right) \qquad (7)$$

To simplify the notation further, spherical harmonics $Y_n^m$ are introduced in Equation (6) resulting in Equation (8) as follows:

$$G(\vartheta_s,\varphi_s,kr_s,kr_a,\vartheta,\varphi)=4\pi\Sigma_{n=0}^{\infty}i^n b_n(kr_a,kr_s)$$
$$\Sigma_{m=-n}^{n} Y_n^m(\vartheta,\varphi)Y_n^{m*}(\vartheta_s,\varphi_s) \qquad (8)$$

where the superscripted asterisk (*) denotes the complex conjugate.

Equation (8) is a general closed-form mathematical expression for the acoustic pressure response on the surface of an acoustically rigid sphere of radius $r_a$ for an incident unity amplitude plane-wave propagating from direction ($\vartheta$, $\varphi$) and at a position on the sphere of ($r_a$, $\vartheta_s$, $\varphi_s$). Similar equations can also be derived for point sound sources and some finite-size sound sources (e.g., spherical cap or flat piston sources) and not just plane-wave incidence. These extensions are useful in order to allow nearfield source positions which may have advantages that are discussed later.

To adopt a mathematical model to the calibration setup, it is desirable to know the distance and orientation between the loudspeaker and the microphone array. These values can either be measured and input by the user or can be automatically detected by the hardware through provided sensors or cameras or both.

Acoustic diffraction and scattering from devices where closed-form expressions do not exist can use numerical computer models based on boundary elements or finite element approaches. For systems that are not amenable to either closed-form solutions or numerical modeling, one could measure the responses from a "Golden" unit where the microphones used in the "Golden" reference measurements were accurately matched so that mismatch error between the reference system microphones was removed, as described previously.

The overall goal in calibration using a computer model of simulated responses is to compute a filter such that, when multiplying the microphone signal by the computed filter, the simulated model response is obtained. This approach boils down to finding the solution to a linear set of equations that use measured data and the desired response as determined by the closed-form or numerical approximate solutions described above. The "best" weights for an FIR filter, an IIR filter, or a hybrid of FIR and IIR filters in series are then computed in a least-squares sense. It may also be desirable to place constraints on the computed response as well as apply regularization methods to add some robustness to the computation, as described in the next section. Least-squares solutions to sets of linear equations are well known and can be efficiently implemented on modern computers. See, e.g., "Matrix Computations" by Gene H. Golub and Charles F. Van Loan, Johns Hopkins University Press; 3rd edition (Oct. 15, 1996), the teachings of which are incorporated herein by reference in their entirety.

The standard system of linear equations is given by Equation (9) as follows:

$$A_j x_j = b_j \qquad (9)$$

where the matrix $A_j$ is a 2N×2N circulant matrix containing the measured sampled time impulse responses for the j-th microphone having length N that is zero padded to length 2N, the vector $x_j$ contains the desired calibration filter impulse response for the j-th microphone, and the vector $b_j$ contains the zero-padded simulated impulse response of length 2N for the j-th microphone. This system of equations is solved for each of the M microphones to obtain the desired M finite impulse response equalization filters. If the matrix $A_j$ is non-singular, then the solution for the equalization filter weights for microphone j is given by Equation (10) as follows:

$$x_j = A_j^{-1} b_j \qquad (10)$$

It is possible that the filter obtained using the above inverse matrix $A_j^{-1}$ might not be stable due to matrix $A_j$ being nearly singular (i.e., having very small eigenvalues). A wide eigenvalue distribution would be expected if there are acoustic response zeros in the measured impulse responses due to scattering and diffraction as well as undesired acoustic reflections, or measurement noise and nulls in the calibration loudspeaker response. One possibility is to augment a single measurement with one or more measurements from different directions. By augmenting the system of equations, the probability of having common zeros that would lead to an ill-posed set of equations is significantly reduced.

It would be possible with the above approach to issue a warning to the user that the matrix A is nearly singular (having a large condition number) and suggest the addition of additional measurements or modeled data to improve the robustness of the solution.

Using Multiple Setups for a Single Calibration

The calibration method described above uses a single setup (relative placement of array/loudspeaker) to perform the calibration. In theory, that is sufficient. However, adding more setups (loudspeaker positions) to perform the calibration will allow for a more-robust result. For example, the loudspeaker can be placed in the front and in the back (horizontal rotation of the array by 180 degrees). Multiple measurements from different angles can be utilized to a) identify potential measurement issues, b) better account (automatically) for near-field setup, c) get similar measurement SNRs for all sensors, and/or d) increase the accuracy of the calibration. This approach would also help to overcome problems with potential singularities in the measured response.

One way to use multiple calibration measurements is to initially treat each measurement independently and compute a set of calibration filters for each measurement. In a second step, one can compare the resulting multiple sets of filters. All measurement results should be nearly identical. For real measurements, it is expected that there will be some variations between the different calibration filter sets. However, if the variations from set to set exceed a certain threshold, then it is likely that there was some issue with the measurement that can be flagged as an indication of a measurement or hardware problem.

Another way to combine multiple measurements is to extend the matrices. Based on the approach described previously, the measured data from other source angular directions would be added as an additional set of 2N rows to the matrix $A_j$, where the additional measured data are also zero padded by N zeros. For K different angular measurements, the number of rows in $A_j$ would be 2KN. Since the augmented system of equations is not square but rather "tall" with 2KN greater than 2N, a pseudo-inverse least-squares solution is given by Equation (11) as follows:

$$\hat{x}_j = A_j^+ b_j = (A_j^T A_j)^{-1} A_j^T b_j \qquad (11)$$

where the + superscript indicates the Moore-Penrose pseudo-inverse. Note that the modeled response vector $b_j$ also needs to be augmented by the new simulated model response that is also zero-padded so that the length of the modeled response vector $b_j$ is 2KN.

It may be needed to further regularize the solution for the least-squares computation by minimizing the augmented functional given as follows:

$$\|A_j x_j - b_j\|^2 + \lambda \|x_j\|^2 \qquad (12)$$

where $\lambda$ is a minimum eigenvalue that is selected by setting it to a small value relative to the maximum eigenvalues of the matrix A.

This regularization is referred to as Tikhonov regularization and is implemented by augmenting the data matrix $A_j$ as given by Equation (13) as follows:

$$\widetilde{A_j} = \begin{bmatrix} A_j \\ \sqrt{\lambda} I \end{bmatrix} \qquad (13)$$

where $\widetilde{A_j}$ is the augmented matrix and I is a (2KN×2KN) identity matrix.

The Tikhonov regularized approximate solution $\hat{x}_j$ is then given by Equation (14) as follows:

$$\hat{x}_j = (A_j^T A_j + \lambda I)^{-1} A_j^T b_j \qquad (14)$$

The value of the scalar $\lambda$ is used to control the approximation to obtain a solution to a system of equations where the minimum eigenvalue would be $\lambda$, which is usually set by examining the approximate solution to see if the solution is appropriate.

Modeling the Microphone Response

Figure 4:
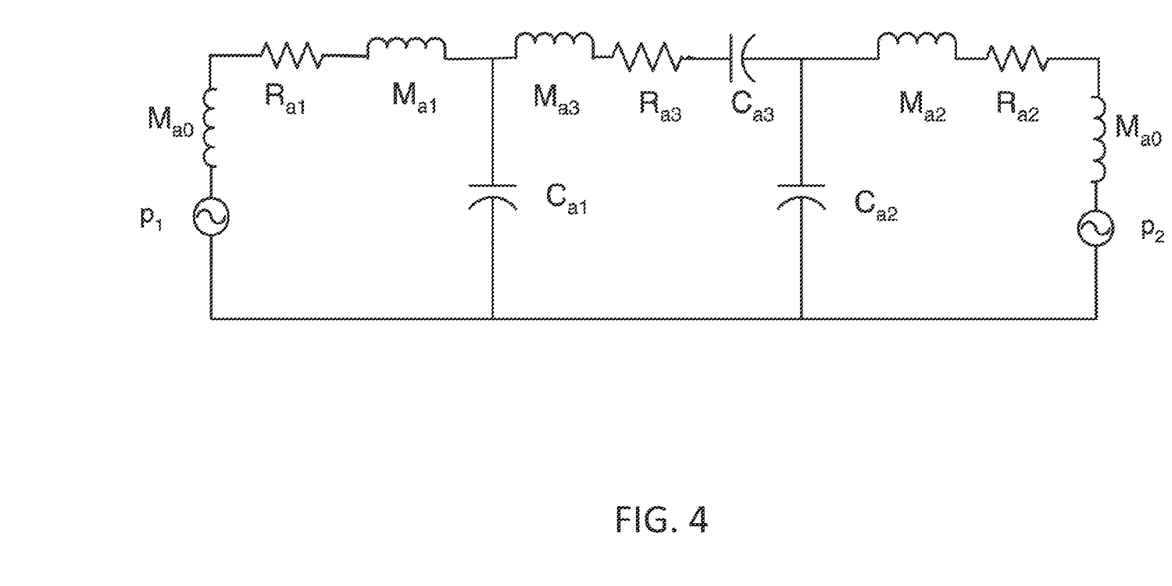
FIG. 4 is a circuit diagram showing a simplified equivalent circuit that models the mechanical response of a typical microphone capsule.

FIG. 4 is a circuit diagram showing a simplified equivalent circuit that models the mechanical response of a typical microphone capsule. The input acoustic pressure is shown as power source $p_1$, and the acoustic pressure at the microphone equalization vent is shown as power source $p_2$. The acoustic components of acoustic mass M (equivalent to electrical inductance), resistance R (equivalent to electrical resistance), and compliance C (equivalent to electrical capacitance) in front of the microphone diaphragm are denoted with the subscript 1. Elements with the subscript 3 define the microphone diaphragm (in acoustic impedances), and elements with the subscript 2 are the acoustic impedances behind the diaphragm leading to the pressure equalization vent pressure $p_2$. The two acoustic compliances to ground ($C_{a1}$ and $C_{a2}$) are from the volumes of air in front and rear of the diaphragm, respectively.

Based on the equivalent circuit model, one could use the calibration measurement to estimate a small number of parameters to fit the model to the measurement rather than directly using an actual measurement response. This approach overcomes the potential problem of having to invert a measured response where the microphone has a response zero since this model would allow the computation of acoustic poles and zeros. The computed poles and zeros would then be used to equalize the microphone response by an inverse filter where the poles are replaced by zeros and zeros by poles. This approach can also help to identify microphone response outliers and avoid using a microphone that is not within desired tolerances.

Use of an Internal Loudspeaker or Loudspeakers

Another approach, similar to the one described above, is to embed a loudspeaker inside the baffle of the spherical array with a hole or group of holes in the baffle to allow radiation of sound from the spherical baffle. Using a single embedded loudspeaker with one or multiple holes or multiple embedded loudspeakers with multiple holes eliminates the need for an external loudspeaker and thereby significantly simplifies the calibration process. Using one or multiple internal loudspeakers also allows for more tight hardware coupling between the ND and D/A hardware which can use the same sample clocking to guarantee clock synchrony if all hardware is located on the same printed circuit boards (PCBs) inside the microphone array housing.

Figure 5:
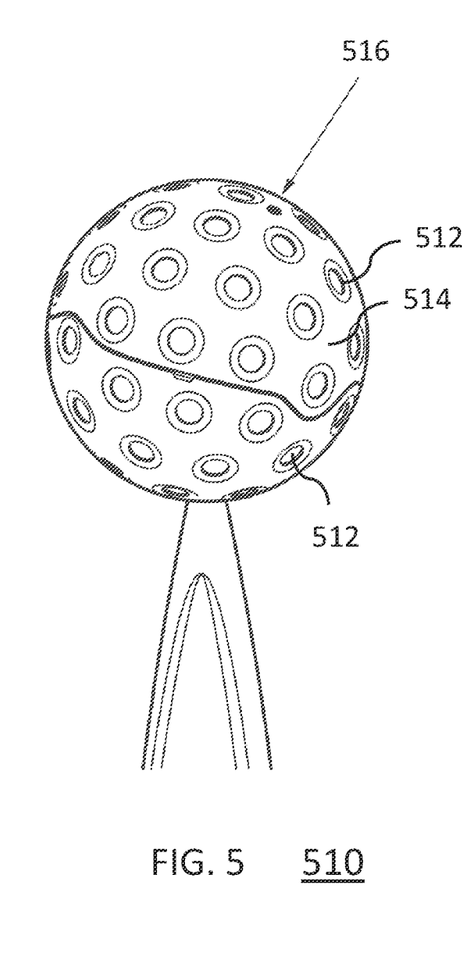
FIG. 5 is a magnified view of a spherical microphone array according to an alternative embodiment of the disclosure.

FIG. 5 is a magnified view of a spherical microphone array 510 according to an alternative embodiment of the disclosure. Like the spherical microphone array 110 of FIG. 1, the array 510 has a number of microphone elements 512 mounted within the openings of an otherwise acoustically rigid baffle 514. In addition, however, array 510 has a loudspeaker (not visible in FIG. 5) embedded inside the baffle 514, which has a loudspeaker output port 516 that enables acoustic signals generated by the loudspeaker to reach all of the microphone elements 512 from outside of the array. In order to avoid problems associated with sound reaching the microphone elements 512 from inside the array, it is preferable to use internal loudspeakers and/or microphone elements that are sealed acoustically inside the array baffle. MEMS microphones and electret capsules that are vented to the front and not to the back would be suitable for the microphone elements 512 if the loudspeaker is not enclosed from the back.

Figure 6:
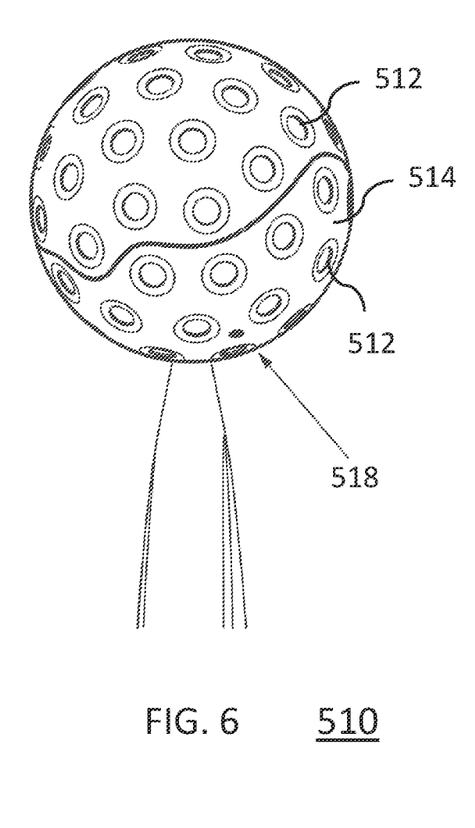
FIG. 6 is a different, magnified view of the spherical microphone array of FIG. 5.

FIG. 6 is a different, magnified view of the spherical microphone array 510 of FIG. 5 in which a second loudspeaker output port 518 is visible. Depending on the particular implementation, array 510 may have one or more loudspeaker output ports in the baffle 514 with one embedded loudspeaker for all of the ports or multiple embedded loudspeakers.

Calibrate Only for Absolute Sensitivity

The calibration method described above measures the full (complex) frequency response of each microphone and therefore the entire microphone array. Depending on the application and/or the microphone capsules, it might be sufficient to adjust for only the absolute sensitivity of the microphones. This approach is motivated by the fact that modern micro-electromechanical system (MEMS) microphone capsules exhibit close matching in frequency responses and vary mainly by the absolute sensitivity of the microphone.

Using only a sensitivity calibration procedure simplifies the calibration since the measurement needs to be performed only at a single frequency or narrow bandwidth around a desired frequency. This frequency can be chosen low enough so that the scattering and diffraction effects in the measurement described previously are kept to a minimum. This approach may also allow one to use bandpassed low-frequency acoustic background noise as the signal used to establish the sensitivity calibration.

Verifying the Calibration

It is important to know that an array is properly calibrated. For this purpose, an automated or a manual approach can be useful. One possible way to verify that the microphone is properly calibrated is to view the Eigenbeam beampatterns (differential or Ambisonic beampatterns) for different orders and degrees of each of the Eigenbeams. However, it is extremely difficult to make a measurement of the 3D beampattern when it involves either rotating the device or a loudspeaker around the device in all spherical directions. Acoustic measurements of this type are normally done in anechoic chambers with multi-axis robotic systems to move the source or rotate the microphone array in all spherical angles, making this approach extremely expensive and therefore not commonly done. However, if the spherical array can be electronically rotated, the 3D rotation of the Eigenbeams can be done in software. By using electronic software steering, only a fixed source at some known angle is needed (actually the angle does not have to be known but knowing it allows for comparison to a designed ideal set of reference 3D Eigenbeam beampatterns). The 3D computed Eigenbeam beampatterns can be numerically compared to the ideal designed Eigenbeam beampatterns and a mean-square error in response can be computed. This mean-square error mismatch in beampattern computation can be (i) used to evaluate the quality of the calibration and (ii) used as a metric to indicate that the calibration is valid or there is a problem with the calibration and/or the microphone array hardware.

One feature that can be exploited here is that the Eigenbeam beampatterns are independent of the source position or can be dealt with using numerical solutions that account for nearfield effects even for non-point sources. Thus, the distance of the loudspeaker to the microphone should not matter, which can greatly simplify the calibration verification and remove possible errors due to source and microphone relative position variation.

Automated Approach

One procedure to verify microphone array calibration is based on the ratio of equalized and normalized Eigenbeam or higher-order differential beamformer signal powers as a function of frequency. Frequency-equalized Eigenbeams or higher-order differential beamformer signals should be relatively constant over frequency for spectrally flat acoustic signals, and the ratio should also be flat even for non-spectrally flat acoustic signals. If the power of higher-order equalized Eigenbeams or higher-order differential beamformer signals exceeds the power of lower-order equalized Eigenbeam levels at lower frequencies, then this would be a good indication of microphone mismatch or other environmental conditions and perhaps indicate the need to recalibrate the microphone array or flag the problem to the user.

Manual Approach

A manual verification could be initiated by the user if either the volume unit (VU) meters show raw or filtered microphone combination deviations that were not seen previously (e.g., exceeding some specified threshold) or some other measure anomaly in the microphone signals was observed. It could also be initiated as a standard procedure to verify that the microphone is meeting design specifications before using the beamforming microphone array system.

Other Potential Methods for In-Situ Calibration

The in-situ calibration method for microphone arrays can have one or more of the following properties:

An internal or external computer application that passively monitors the levels of each microphone in the array over time and flags potential issues. Any detection of a potential calibration issue would be brought to the user's attention through, for example, LED flashing on the device or a pop-up on an external computer application. For that purpose, the computer would store the original (factory) calibration and the last N field calibration results, NA. Data storage can be static memory inside the sphere or part of the software application that controls and records the array signals. Another possible detection method would be to use the Eigenbeam/Ambisonic signals and relative levels to determine the diffuseness of the sound field. If the field is determined or otherwise known to be diffuse, then that knowledge can be used to compare the Eigenbeam level ratios as a function of frequency and flag ratios that would indicate a calibration problem. Another possibility is to use long- and short-term microphone-level statistics. Comparisons for the minimum noise statistic (lowest level over some defined period of time) or maximum level statistic (at lower frequencies to remove diffraction variations) to verify all microphones fall within allowable level variance values.

A method that would allow a smart phone to act as the calibration sound source. A "calibration app" on the smart phone can be used to guide the user through the calibration steps, e.g., move the phone to different positions for multiple angle measurements. Gyroscope, accelerometer, and camera data from the phone could be used to identify phone movement relative to the microphone array to obtain information for position and orientation relative to the microphone array. This measurement technique could select one microphone on the array as a reference microphone to which all other microphones would be referenced from, thereby allowing the estimation of the relative complex frequency response for each microphone. For this type of relative measurement, the source signal would not have to be known or synchronized to the microphone capture sampling rate. The test signal from the smart phone would contain all frequencies in the desired range of calibration in order to estimate the relative response at all desired frequencies.

Potential to use ultrasonic signals in the calibration signal to detect the calibration loudspeaker angular position relative to the microphone array. The concept is to use ultrasonics from the loudspeaker where the high frequencies get absorbed by natural absorption in the air. Thus, this source can overcome background noise and is naturally more similar than anechoic measurement due to air absorption. The differences in the responses to the microphones in the array at ultrasonic frequencies would be such that the direction of the loudspeaker relative to the array could be determined. This feature could allow the user to place the loudspeaker without the need to align it to some specific direction. At ultrasonic frequencies, the spherical baffle will form a strong shadow zone and a "hot spot" on the opposite side of the array. Detection of this shadow zone and hot spot could also be used to accurately determine the angular location of the loudspeaker.

It would also be possible to include cameras mounted on or in the microphone array spherical baffle itself to allow for the automatic detection of the calibration loudspeaker position relative to the microphone array either through image detection of the loudspeaker position by the use of specific light sources, possibly using colors placed as location markers on the loudspeaker device.

The inclusion of gyros and accelerometers inside or on the calibration loudspeaker to track the position from an initial known location relative to the microphone array. These telemetry signals would then be used for multiple calibration runs from different locations with the position of the loudspeaker for each measurement being obtained from the gyro and accelerometer signals.

The inclusion of a camera or cameras mounted inside or on the calibration loudspeaker to detect its position relative to the microphone array using LED lights on the microphone array or image detection algorithms.

The use of a smart phone to take a photograph of the calibration setup and resolve the positions and relative orientations of the loudspeaker and the microphone array. Registration marks on either the microphone array or the loudspeaker or both can be used to aid the location calculation from the photograph to compute the relative positions and orientations.

The use of the calibration algorithm to ascertain some physical properties of sound diffracting and scattering around a wearer's head when using head-mounted microphone arrays. One outstanding issue in spatial audio playback is to find a relatively close match to stored Head-Related-Transfer Functions (HRTFs). Using one of the calibration schemes described above may also allow one to determine from purely acoustic sound field what HRTF would be the best match for the person wearing the microphone array or arrays on their head. For instance, if the microphone array is known to be calibrated before being placed on the head and if the calibration algorithm is performed after the microphone array is placed on the head, then measured changes in the calibration due to scattering and diffraction of the head may be useful in determining some general properties of the head such as head size. If there are multiple arrays mounted to the head, then the relative differences in the calibrations between the multiple arrays could also be used in a metric that allows one to estimate some desirable physical properties of the head.

Use of impulse-response time-domain editing to remove the impact of reflections of a room allowing calibration in a room and not requiring an anechoic chamber. The above calibration filter estimation is dependent on a direct sound free-field ensonification of the microphone array (anechoic conditions). For measurements made in real rooms, it is important to remove the room reflections of sound from the measured impulse responses. In order to do this, the loudspeaker and microphone measurement setup should be done such that the direct sound impulse response of the loudspeaker and microphone have decayed significantly in time before any reflections arrive at the array. Here, the term "significantly" means that there is sufficient decay in the direct sound (anechoic) response such that removing the remaining time of the impulse response does not change the magnitude of the frequency response by more than 1 dB. This rule-of-thumb is not a tight bound. If the microphone array and the loudspeaker are set up away from the room boundary surfaces (near the center of the room, for instance), then it should be possible to have at least 5 ms from the onset of the direct impulse response peak to the first reflection. The means that the first reflecting surface sound path should have a delay of approximately 5 ms relative to the direct sound path from the loudspeaker to the microphone array. The length of the direct impulse response will most likely be dominated by the loudspeaker response so selecting a non-resonant wide-band flat loudspeaker would be advantageous to limit the extent of the loudspeaker's contribution to the length of the direct sound impulse response. By using a setup that allows for the separation of the direct part of the impulse response from the reflection region of the impulse responses, the impulse response can be edited by zeroing out or significantly attenuating the reverberant part of the impulse response and therefore obtain an impulse response that would be close to a measured impulse response in an anechoic chamber. The above technique of time-domain edition of the impulse response is limited to frequency regions where cutting the impulse response does not remove more than a few percent of the overall true impulse of the source loudspeaker and microphone array system. Smoother tapering time editing windows can be used on the direct path impulse response other than a uniform window to control spurious effects on the measured direct path frequency response by the hard clipping off of the impulse response in time.

The use of calibration signals to detect one or more outlier microphone elements in the array during array manufacturing. For example, the audio signals generated by different microphone elements can be compared to one another for a given acoustic signal as well as comparing the audio signals generated by the same microphone element for different acoustic signals from different directions and/or at different frequencies to detect outlier microphone elements whose audio signals that are not consistent with the audio signals from other microphone elements in the array. For example, the magnitude of audio signals generated by microphone elements facing an acoustic source should be greater than the magnitude of audio signals generated by microphone elements facing away from that same acoustic source. If the audio signals from one or more particular microphone elements are inconsistent with that expectation, then it may be an indication that those one or more microphone elements are mounted incorrectly or otherwise not operating properly, such that remedial action can be taken to re-mount or replace any such outlier microphone elements in the array.

All of the above methods identify the (direction-independent) frequency response of the microphone capsules. For more-complex scattering structures or structures that have some variability from unit to unit, it can be of interest to also include some of the (direction-dependent) scattering response into the calibration response. See, e.g., U.S. Pat. No. 10,659,873, the teachings of which are incorporated herein by reference in their entirety.

Although the disclosure has been described in the context of microphone arrays in which the plurality of microphones are substantially evenly distributed over the surface of an acoustically rigid, spheroidal baffle, in general, the disclosure can be implemented in the context of any suitable one-, two-, or three-dimensional geometry of microphone elements mounted on any suitable structure.

In certain embodiments, the present disclosure is a method for calibrating a microphone array having a plurality of microphone elements, the method comprising (i) ensonifying the microphone array at a first direction relative to the microphone array with a first acoustic signal to concurrently generate a first set of audio signals from two or more of the microphone elements and (ii) processing the first set of audio signals to calibrate the two or more microphone elements.

In at least some of the above embodiments, the first set of audio signals are processed to calibrate the two or more microphone elements by computing calibration filter weights for a time-domain FIR, IIR, or hybrid FIR/IIR filter by convolving (i) measured impulse responses corresponding to the first set of audio signals with (ii) a computed calibration filter to best match impulse responses corresponding to a reference microphone element, where best match is determined by using an L2 norm (but could also use Lp norm where p is an integer).

In at least some of the above embodiments, a least-squares approximation of reference calibration filter weights are computed as a solution to a matrix inverse problem using the measure and ideal reference impulse responses.

In at least some of the above embodiments, the method further comprises ensonifying the microphone array at one or more other directions relative to the microphone array with one or more other acoustic signals to generate one or more other sets of audio signals from the two or more microphone elements, wherein the first set and the one or more other sets of audio signals are processed to calibrate the two or more microphone elements.

In at least some of the above embodiments, the first acoustic signal and the one or more other acoustic signals ensonify the microphone array at a plurality of different angles around the microphone array.

In at least some of the above embodiments, the first acoustic signal and the one or more other acoustic signals ensonify the microphone array at a plurality of different distances from the microphone array.

In at least some of the above embodiments, the first acoustic signal and the one or more other acoustic signals ensonify the microphone array at a plurality of different elevations relative to the microphone array.

In at least some of the above embodiments, the first acoustic signal and the one or more other acoustic signals are generated by an acoustic source located outside of the microphone array at different positions relative to the microphone array.

In at least some of the above embodiments, the first acoustic signal and the one or more other acoustic signals are generated by a single or multiple acoustic sources located inside of the microphone array.

In at least some of the above embodiments, a microphone element in the microphone array is a reference microphone element relative to which the two or more microphone elements are calibrated.

In at least some of the above embodiments, the first acoustic signal is generated by an acoustic source located outside of the microphone array.

In at least some of the above embodiments, the first acoustic signal is generated by an acoustic source located inside of the microphone array.

In at least some of the above embodiments, the first acoustic signal is generated by an acoustic source located at a position relative to the microphone array; the processing to calibrate the two or more microphone elements is based on the position of the acoustic source relative to the microphone array; and the method further comprises automatically determining the position of the acoustic source relative to the microphone array.

In at least some of the above embodiments, the position of the acoustic source relative to the microphone array is automatically determined using one or more of (i) gyroscope or accelerometer data corresponding to movement of at least one of the acoustic source and the microphone array; (ii) one or more photographs of the acoustic source and the microphone array; and (iii) audio signals generated by at least one microphone element in response to being ensonified by ultrasonic acoustic signals generated by the acoustic source and directed at the microphone array.

In at least some of the above embodiments, the method is performed outside of an anechoic chamber.

In at least some of the above embodiments, the method is performed at a location where the calibrated microphone array is subsequently used for on-line operations.

In at least some of the above embodiments, the first set of audio signals is filtered prior to calibrating the two or more microphone elements to diminish impact of reflections of the first acoustic signal arriving at the microphone array.

In at least some of the above embodiments, the first set of audio signals is processed to detect at least one outlier microphone element in the microphone array.

In at least some of the above embodiments, the microphone array comprises the plurality of microphone elements substantially evenly distributed over the surface of an acoustically rigid, spheroidal baffle.

Embodiments of the disclosure may be implemented with (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method for calibrating a microphone array having a plurality of microphone elements, the method comprising:
ensonifying the microphone array at a first direction relative to the microphone array with a first acoustic signal to concurrently generate a first set of audio signals from two or more of the microphone elements; and
processing the first set of audio signals to calibrate the two or more microphone elements, wherein the first set of audio signals are processed to calibrate the two or more microphone elements by computing calibration filter weights for a time-domain FIR, IIR, or hybrid FIR/IIR filter by convolving (i) measured impulse responses corresponding to the first set of audio signals with (ii) a computed calibration filter to match impulse responses corresponding to a reference microphone element.

2. The method of claim 1, wherein a least-squares approximation of reference calibration filter weights are computed as a solution to a matrix inverse problem using the measure and ideal reference impulse responses.

3. The method of claim 1, further comprising ensonifying the microphone array at one or more other directions relative to the microphone array with one or more other acoustic signals to generate one or more other sets of audio signals from the two or more microphone elements, wherein the first set and the one or more other sets of audio signals are processed to calibrate the two or more microphone elements.

4. The method of claim 3, wherein the first acoustic signal and the one or more other acoustic signals ensonify the microphone array at a plurality of different angles around the microphone array.

5. The method of claim 3, wherein the first acoustic signal and the one or more other acoustic signals ensonify the microphone array at a plurality of different distances from the microphone array.

6. The method of claim 3, wherein the first acoustic signal and the one or more other acoustic signals ensonify the microphone array at a plurality of different elevations relative to the microphone array.

7. The method of claim 3, wherein the first acoustic signal and the one or more other acoustic signals are generated by an acoustic source located outside of the microphone array at different positions relative to the microphone array.

8. The method of claim 3, wherein the first acoustic signal and the one or more other acoustic signals are generated by multiple acoustic sources located inside of the microphone array.

9. The method of claim 1, wherein a microphone element in the microphone array is a reference microphone element relative to which the two or more microphone elements are calibrated.

10. The method of claim 1, wherein the first acoustic signal is generated by an acoustic source located outside of the microphone array.

11. The method of claim 1, wherein the first acoustic signal is generated by an acoustic source located inside of the microphone array.

12. The method of claim 1, wherein:
the first acoustic signal is generated by an acoustic source located at a position relative to the microphone array;
the processing to calibrate the two or more microphone elements is based on the position of the acoustic source relative to the microphone array; and
the method further comprises automatically determining the position of the acoustic source relative to the microphone array.

13. The method of claim 12, wherein the position of the acoustic source relative to the microphone array is automatically determined using one or more of:
gyroscope or accelerometer data corresponding to movement of at least one of the acoustic source and the microphone array;
one or more photographs of the acoustic source and the microphone array; and
audio signals generated by at least one microphone element in response to being ensonified by ultrasonic acoustic signals generated by the acoustic source and directed at the microphone array.

14. The method of claim 1, wherein the method is performed outside of an anechoic chamber.

15. The method of claim 14, wherein the method is performed at a location where the calibrated microphone array is subsequently used for on-line operations.

16. The method of claim 14, wherein the first set of audio signals is filtered prior to calibrating the two or more microphone elements to diminish impact of reflections of the first acoustic signal arriving at the microphone array.

17. The method of claim 1, wherein the first set of audio signals is processed to detect at least one outlier microphone element in the microphone array.

18. The method of claim 1, wherein the microphone array comprises the plurality of microphone elements substantially evenly distributed over the surface of an acoustically rigid, spheroidal baffle.

19. A method for calibrating a microphone array having a plurality of microphone elements, the method comprising:
ensonifying the microphone array at a first direction relative to the microphone array with a first acoustic signal to concurrently generate a first set of audio signals from two or more of the microphone elements; and
processing the first set of audio signals to calibrate the two or more microphone elements, wherein:
the first acoustic signal is generated by an acoustic source located at a position relative to the microphone array;
the processing to calibrate the two or more microphone elements is based on the position of the acoustic source relative to the microphone array;
the method further comprises automatically determining the position of the acoustic source relative to the microphone array; and the position of the acoustic source relative to the microphone array is automatically determined using one or more of:
  gyroscope or accelerometer data corresponding to movement of at least one of the acoustic source and the microphone array;
  one or more photographs of the acoustic source and the microphone array; and
  audio signals generated by at least one microphone element in response to being ensonified by ultrasonic acoustic signals generated by the acoustic source and directed at the microphone array.

\* \* \* \* \*